United States Patent
Kang (10) Patent No.: US 11,602,650 B2
(45) Date of Patent: Mar. 14, 2023

(54) FIRE SUPPRESSION SYSTEM FOR VEHICLE

(71) Applicants: Hyundai Motor Company, Seoul (KR); Kia Motors Corporation, Seoul (KR)

(72) Inventor: Kyung Wan Kang, Jeollabuk-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 137 days.

(21) Appl. No.: 17/099,971

(22) Filed: Nov. 17, 2020

(65) Prior Publication Data

US 2021/0283437 A1  Sep. 16, 2021

(30) Foreign Application Priority Data

Mar. 11, 2020 (KR) .................. 10-2020-0029921

(51) Int. Cl.
*A62C 3/07* (2006.01)
*A62C 2/24* (2006.01)
*A62C 3/16* (2006.01)

(52) U.S. Cl.
CPC .............. *A62C 2/24* (2013.01); *A62C 3/07* (2013.01); *A62C 3/16* (2013.01)

(58) Field of Classification Search
CPC ... A62C 99/0018; A62C 99/0009; A62C 8/06; A62C 3/07; A62C 2/24; A62C 2/10
See application file for complete search history.

(56) References Cited

U.S. PATENT DOCUMENTS

| | | | |
|---|---|---|---|
| 5,501,284 A | * 3/1996 | Clodfelter | .......... A62C 99/0018 239/533.13 |
| 2017/0113080 A1 | * 4/2017 | Specht | ..................... A62D 1/06 |

FOREIGN PATENT DOCUMENTS

| | | | | |
|---|---|---|---|---|
| CN | 106693233 A | | 5/2017 | |
| CN | 109568833 A | | 4/2019 | |
| CN | 110354419 | * | 10/2019 | ............... A62C 3/07 |
| DE | 102013200734 | * | 7/2014 | ............... A62C 3/07 |
| GB | 2340799 | * | 8/1998 | ............... A62C 3/07 |

\* cited by examiner

*Primary Examiner* — Christopher R Dandridge
(74) *Attorney, Agent, or Firm* — Fox Rothschild LLP

(57) ABSTRACT

A fire suppression apparatus for a vehicle includes a sensor for detecting a condition of an object mounted in the vehicle, a controller configured to determine whether the condition of the object mounted in the vehicle, which is detected by the sensor, satisfies a predetermined criterion for determining outbreak of fire and to output a control signal for suppression of the fire when the condition of the object satisfies the predetermined criterion, and a spread bag apparatus mounted in the vehicle, which is configured to unfold a collapsed spread bag toward the object in response to the control signal from the controller such that the unfolded spread bag hermetically covers the object, thereby suppressing fire at the object.

11 Claims, 4 Drawing Sheets

FIG. 4

FIRE SUPPRESSION SYSTEM FOR VEHICLE

CROSS-REFERENCE TO RELATED APPLICATION

This application claims under 35 U.S.C. § 119(a) the benefit of Korean Patent Application No. 10-2020-0029921 filed on Mar. 11, 2020, the entire contents of which are incorporated herein by reference.

BACKGROUND

(a) Technical Field

The present disclosure relates to a fire suppression apparatus for a vehicle, more particularly, to the fire suppression apparatus that is capable of efficiently suppressing fire prior to spreading of flames when an object, such as a battery, mounted in the vehicle catches fire.

(b) Description of the Related Art

Eco-friendly vehicles, such as electric vehicles, hybrid electric vehicles, fuel cell vehicles, etc., which are designed to be run by means of motors, have become more common due to environmental regulations around the world.

Such eco-friendly vehicles may include a hybrid electric vehicle (HEV), a battery electric vehicle (BEV), a fuel-cell electric vehicle (FCEV) and the like.

Among eco-friendly vehicles, the hybrid electric vehicle is represented by a plug-in hybrid electric vehicle (PHEV). The plug-in hybrid electric vehicle (PHEV) and the battery electric vehicle (BEV) are electric vehicles, and are configured to charge batteries using power supplied from outside the vehicle.

All eco-friendly vehicles include a motor as an apparatus for driving the vehicle and a battery for supplying power to the motor.

When a battery of an eco-friendly vehicle catches fire, fire may spread in a short period of time due to the internal structure and constituent material of the battery. As an approach for dealing with a fire in a vehicle, it is predominantly known to simply provide a fire extinguisher in the vehicle.

However, when a driver does not use the fire extinguisher in time, an attempt to extinguish the fire early may fail, and thus the fire may spread throughout the vehicle. Particularly, when a battery catches fire, it is impossible in practice to suppress the fire using only a small-sized fire extinguisher or by spraying an extinguishing agent due to the internal constituent material in the battery.

Furthermore, because certain vehicles, such as a bus, accommodates a large number of passengers riding therein, it is essential to quickly respond to the fire for the safety of the passengers. If the first attempt to extinguish the fire fails, the fire may result in injuries and/or fatalities.

In addition, because a driver is located inside the vehicle during traveling of the vehicle, when a battery catches fire, it is difficult to recognize the outbreak of the fire until a large amount of smoke is generated. Furthermore, because a bus has a large and long body unlike a passenger automobile, it is even more difficult to recognize the outbreak of fire.

Hence, a driver cannot perform suppression work for the fire in the early stages of the outbreak of the fire, and thus the fire may spread, thereby causing complete destruction of the vehicle and increasing the risk of harm to humans.

Even when a driver or a passenger in the vehicle quickly recognizes the outbreak of a fire, it is difficult to quickly suppress the fire at the battery using only a small-sized fire extinguisher provided in the vehicle.

As eco-friendly vehicles become more popular, the risk of occurrence of a fire in a battery or a peripheral high-voltage electric wire attributable to an external impact or internal short-circuit is increasing.

However, because an efficient approach for suppressing the outbreak of fire at a battery has not yet been achieved, there is a risk of complete destruction of a vehicle or significant harm to passengers.

The above information disclosed in this Background section is only for enhancement of understanding of the background of the disclosure and therefore it may contain information that does not form the prior art that is already known in this country to a person of ordinary skill in the art.

SUMMARY

It is an object of the present disclosure to provide a fire suppression apparatus for a vehicle, which is capable of efficiently suppressing fire prior to spreading of flames when an object, such as a battery, mounted in the vehicle catches fire.

In one aspect, the present disclosure provides a fire suppression apparatus for a vehicle including a sensor for detecting a condition of an object mounted in the vehicle, a controller configured to determine whether the condition of the object mounted in the vehicle, which is detected by the sensor, satisfies a predetermined criterion for determining outbreak of fire and to output a control signal for suppression of the fire when the condition of the object satisfies the predetermined criterion, and a spread bag apparatus mounted in the vehicle, which is configured to unfold a collapsed spread bag toward the object in response to the control signal from the controller such that the unfolded spread bag hermetically covers the object, thereby suppressing fire at the object.

The object may be a battery mounted in the vehicle. More specifically, the vehicle may be a vehicle configured to be driven by a motor, and the object may be a battery for supplying power to the motor.

The sensor may be a temperature sensor for detecting a temperature of the object, and the controller compares the temperature of the object, which is detected by the temperature sensor, with a reference temperature, and determines that the criterion for determining outbreak of fire is satisfied when the temperature of the object is greater than or equal to the reference temperature.

The spread bag apparatus may be mounted in the vehicle so as to be positioned over the object, and may be configured to unfold the collapsed spread bag downwards toward the object.

The spread bag apparatus may includes a housing mounted in the vehicle, an inflator module disposed in the housing so as to generate gas in response to the control signal from the controller, and a spread bag accommodated in the housing in a state of being collapsed, the spread bag being unfolded as the gas generated from the inflator module is injected thereinto.

The housing may include a housing body, having an internal space accommodating the inflator module and the spread bag, and a cover, coupled to the housing body so as to support the spread bag accommodated in the housing body, wherein, when the spread bag is expanded, the spread bag separates the cover from the housing body to open the housing body and is unfolded outwards from the housing through the opened area in the housing body.

The inflator module may include a squib configured to be operated in response to the control signal from the controller, an igniting agent configured to be ignited upon operation of the squib, and a gas-generating agent configured to be combusted by the ignition of the igniting agent and to inject expansion gas, generated by the combustion, into the spread bag.

The inflator module may further include a case disposed in the housing, the case accommodating the squib, the igniting agent and the gas-generating agent, and the spread bag may be disposed in a space between the case and the housing in a state of being secured at a portion thereof to an outer surface of the case via a retainer.

The case may include a plurality of injection ports through which the expansion gas generated from the gas-generating agent is injected into the spread bag, the plurality of injection ports being respectively coupled to injection inlets in the spread bag so as to allow the expansion gas to be injected into the spread bag.

When the spread bag is expanded and unfolded, some of the plurality of injection ports may be separated from the injection inlets in the spread bag by shape deformation of the spread bag such that the gas charged in the spread bag is discharged to an outside of the spread bag through the injection inlets from which the injection ports are separated.

The inflator module may further include a filter, which is disposed in the case so as to surround the gas-generating agent and removes foreign substances from the expansion gas generated from the gas-generating agent.

The fire suppression apparatus may further include a cooling water supply mounted in the vehicle so as to sprinkle cooling water onto the spread bag, which has been unfolded so as to cover the battery pack.

The cooling water supply may include a sprinkle pipe mounted in the vehicle so as to extend toward an upper portion of the battery pack, the cooling water being supplied to the sprinkle pipe, a nozzle coupled to the sprinkle pipe so as to sprinkle the cooling water in the sprinkle pipe onto the spread bag, which has been unfolded so as to cover the battery pack, and an electromagnetic valve, configured to open and close a cooling channel in the nozzle or the sprinkle pipe in response to a control signal for sprinkling of the cooling water, which is output from the controller.

The controller may output the control signal to sprinkle the cooling water after a predetermined period of time after the spread bag apparatus is activated so as to unfold the spread bag.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof, illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, reference will now be made in detail to various embodiments of the present disclosure, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, included within the spirit and scope of the disclosure as defined by the appended claims.

Hereinafter, embodiments of the present disclosure will be described in detail with reference to the accompanying drawings so as to be easily embodied by those skilled in the art to which the present disclosure belongs. However, the present disclosure is not limited to the embodiments disclosed herein, and may be embodied into various modification and variations.

The present disclosure relates to a fire suppression apparatus for a vehicle, which is capable of efficiently suppressing fire prior to spreading of flames when an object, such as a battery, mounted in the vehicle catches fire.

The fire suppression apparatus according to the present disclosure is characterized by determining whether the condition of an object mounted in a vehicle satisfies the criterion for determining outbreak of fire by monitoring the object and by unfolding a spread bag so as to cover the object when the criterion for determining outbreak of fire is determined to be satisfied, thereby performing automatic fire suppression by blocking supply of oxygen.

Here, the object may be a battery mounted in the vehicle. In the embodiment, the battery may be a battery of pack unit, that is, a battery pack.

The vehicle may be an eco-friendly vehicle, which is run by a motor configured to be driven by power from a battery. In this case, the object may be the battery for supplying power to the motor.

Hereinafter, the construction of the fire suppression apparatus according to the embodiment of the present disclosure will be described in detail with reference to the accompanying drawings, in the case in which the object is, for example, a battery pack.

Figure 1:
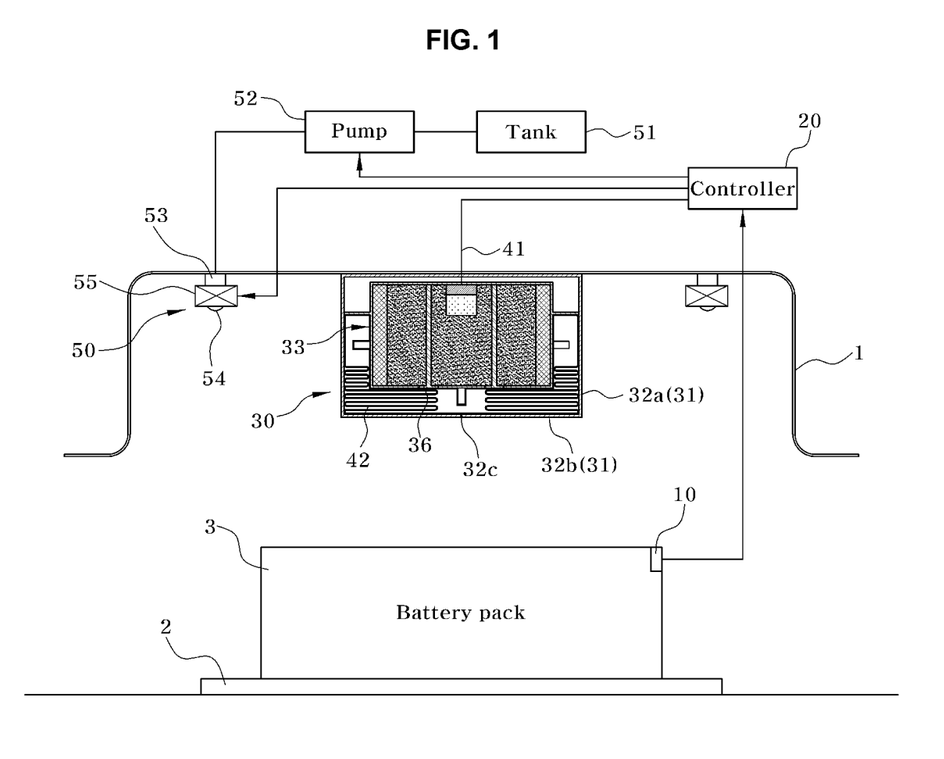
FIG. 1 is a view showing the construction of a fire suppression apparatus according to an embodiment of the present disclosure.

FIG. 1 is a view showing a construction of the fire suppression apparatus according to the embodiment of the present disclosure.

As illustrated in FIG. 1, the fire suppression apparatus according to the embodiment may include a sensor for detecting the condition of a battery pack 3, a controller 20 for receiving a signal from the sensor 10 and determining whether the condition of outbreak of fire specified for the battery pack 3 is satisfied based on the signal, and a bag-spreading apparatus 30 configured to be operated in response to the control signal from the controller 20.

In the embodiment of the present disclosure, the sensor 10 may be a temperature sensor configured to measure temperature of the battery pack 3 and to output a signal corresponding to the measured value. The temperature sensor 10 is mounted on the battery pack 3, and is connected to the controller 20 so as to transmit a signal to the control 20. The controller 20 receives the signal output from the temperature sensor 10 and determines whether the criterion for determining outbreak of fire at the battery pack 3 is satisfied based on a temperature corresponding to the signal.

Here, the state in which the criterion for determining outbreak of fire at the battery pack 3 is satisfied may mean a state in which fire currently breaks out at the battery pack 3, or a state in which temperature of the battery pack 3 reaches the temperature at which fire can break out.

In other words, the state in which the criterion for determining outbreak of fire at the battery pack 3 is satisfied may mean a state in which temperature of the battery pack 3 reaches the temperature at which fire can break out, that is, a state temperature of the battery pack 3 reaches a high temperature at which there is the possibility of outbreak of fire even though fire does yet not break out.

In the embodiment of the present disclosure, the controller 20 may be set so as to compare the temperature of the battery pack 3, which is measured by the temperature sensor 10, with a predetermined reference temperature, and to determine that the criterion for determining outbreak of fire at the battery pack 3 is satisfied when the temperature of the battery pack 3 is greater than or equal to the reference temperature.

In other words, the controller 20 compares the temperature of the battery pack 3, which is measured in real time, with the reference temperature so as to determine whether the temperature of the battery pack 3 reaches a temperature at which fire can break out or whether a fire has already started.

When the criterion for determining outbreak of fire is determined to be satisfied, the controller 20 outputs a control signal for control of fire suppression, that is, a control signal to spread out the spread bag 42 so as to hermetically cover the battery pack 3.

Consequently, the spread bag apparatus 30 unfolds the spread bag 42 to hermetically cover the battery pack 3 in response to the control signal output from the controller 20.

As a result, since the battery pack 3 is hermetically covered by the unfolded spread bag 42, it is possible to suppress outbreak or spreading of fire at the battery pack 3.

Referring to FIG. 1, it is noted that the battery pack 3 is mounted on and supported by a mount structure 2 fixed to a vehicle body (not shown) and that a body panel 1 is disposed on the battery pack 3 so as to cover the battery pack 3.

Figure 2:
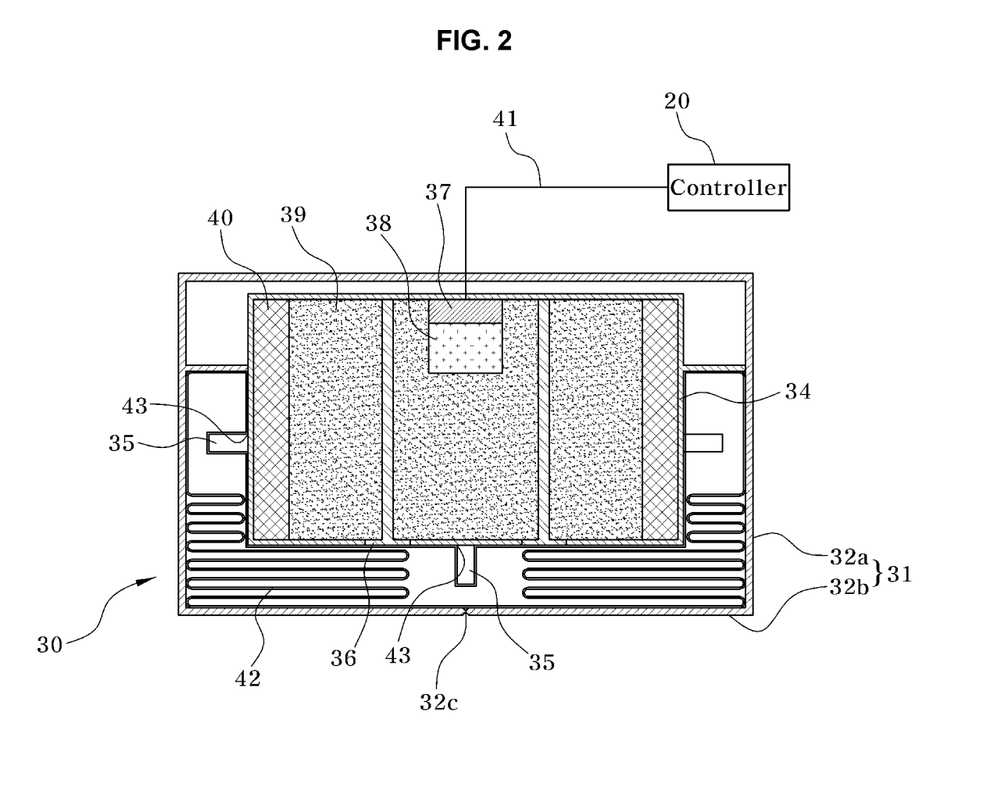
FIG. 2 is a cross-sectional view schematically showing the internal construction of a spread bag apparatus according to the embodiment of the present disclosure.
Figure 3:
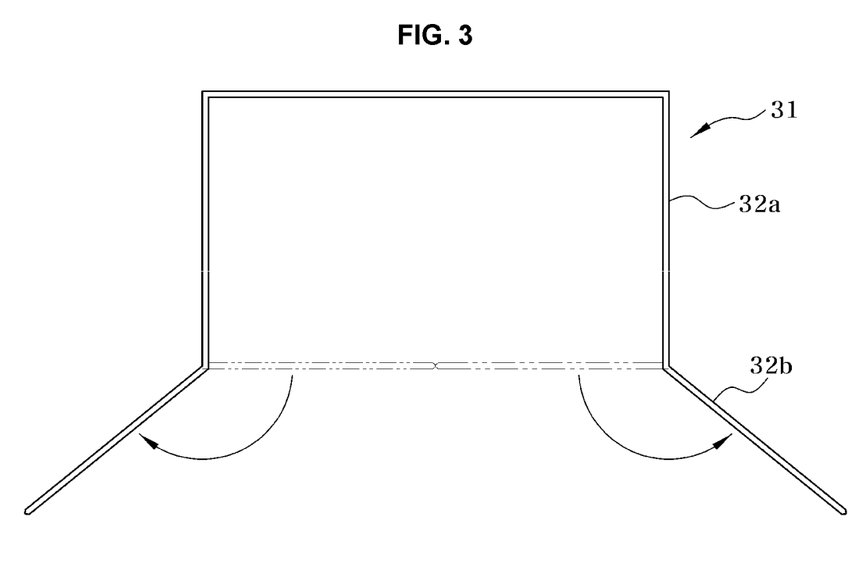
FIG. 3 is a cross-sectional view showing a housing of the spread bag apparatus according to the embodiment of the present disclosure.

FIG. 2 is a cross-sectional view showing the internal construction of the spread bag apparatus according to the embodiment of the present disclosure. FIG. 3 is a cross-sectional view showing a housing of the spread bag apparatus according to the embodiment of the present disclosure.

FIG. 3 illustrates a state in which a cover 32b is rotated from a housing body 32a by the expansion force of the spread bag 42 so as to open a housing 31.

In the embodiment of the present disclosure, the spread bag apparatus 30 is mounted on the body panel 1 so as to be positioned over the battery pack 3. The spread bag apparatus 30 may include the housing 31 fixedly mounted on the body panel 1, an inflator module 33 disposed inside the housing 31 so as to generate gas in response to the control signal from the controller 20, and the spread bag 42, which is accommodated in a collapsed state in the housing 31 and which is expanded and unfolded to hermetically cover the battery pack 3 when the inside of the housing 31 is filled with gas generated from the inflator module 33. The housing 31 may include the housing body 32a having an internal space having a predetermined volume and the cover 32b, coupled to the lower end of the housing body 32a so as to hermetically close the internal space of the housing body 32a and to support the spread bag 42.

The housing body 32a provides a space in which the inflator module 33 and the spread bag 42 are accommodated, and the cover 32b is coupled to the lower end of the housing body 32a so as to be separated from the lower end of the housing body 32*a* by the unfolded spread bag 42 when the spread bag 42 in the housing body 32*a* is unfolded.

In the embodiment of the present disclosure, a perforated line, which is capable of being broken by the expansion force of the spread bag 42, may be formed between the housing body 32*a* and the cover 32*b* along the periphery of the cover 32*b* excluding at least a portion of the cover 32*b*, as in a door of an air bag, which is one of restraint devices for a passenger.

As a result, when the expansion force of the spread bag 42, that is, the intensive force generated by expansion of the spread bag 42, is applied to the cover 32*b*, the cover 32*b* is rotated about the portion of the periphery in which the perforated line is not formed, thereby opening the housing body 32*a*.

In this way, as the spread bag 42 is unfolded, the spread bag 42 separates the cover 32*b* from the housing body 32*a* to open the housing body 32*a* and projects to the outside of the housing 31 through the open area of the housing body 32*a* (the lower surface of the housing 31 in FIG. 2) to cover the battery pack 3.

As illustrated in FIG. 2, the inflator module 33 may include a squib 37, which is configured to explode in response to a control signal (i.e., an ignition signal) applied from the controller 20, an igniting agent 38, which is ignited upon explosion of the squib 37, and a gas-generating agent 39, which is combusted by the ignition of the igniting agent 38 so as to generate expansion gas.

In the embodiment of the present disclosure, the squib 37, the igniting agent 38 and the gas-generating agent 39 may be collectively accommodated in a separate case 34 disposed in the internal space in the housing 31 so as to be disposed at respective positions in the internal space in the case 34.

Here, the spread bag 42 is accommodated in the space between the housing 31 and the case 34, that is, in the internal space in the housing 31 but outside the case 34.

Referring to FIG. 2, a filter 40, which is intended to remove foreign substances from the expansion gas, may be disposed in the case 34 so as to surround the gas-generating agent 39.

The spread bag 42 is accommodated in the space between the housing 31 and the case 34 in the state of being secured at a portion thereof to a retainer 36 mounted on the case 34. Here, the portion of the spread bag 42 may be secured to the outer surface of the case 34, more specifically, to the lower surface of the outer surface of the case 34, via the retainer 36. Referring to FIG. 2, it is noted that the gas-generating agent 39 is divided into two at right and left sides of the squib 37 and the igniting agent 38. As illustrated in FIG. 2, the gas-generating agent 39 may be distributed at multiple positions in the internal space in the case 34.

The squib 37 is configured to receive a control signal from the controller 20, that is, an electrical signal (an ignition signal) for generation of gas of the inflator module 33. To this end, the squib 37 is connected to the controller 20 via a connector (not shown) and a wire 41.

The squib 37 and the igniting agent 38 may be disposed in the internal space in the case 34 in the state of being connected to each other so as to allow the igniting agent 38 to be ignited when the weak explosion of the squib 37 occurs. Furthermore, the igniting agent 38 and the gas-generating agent 39 may be disposed in the internal space in the case 34 in the state of being connected to each other so as allow the gas-generating agent 39 to begin to combust due to ignition of the igniting agent 38.

In the embodiment of the present disclosure, sodium azide, which is capable of generating nitrogen upon combustion thereof, may be used as the gas-generating agent 39.

Sodium azide is also used in an air bag apparatus, which is a restraint apparatus, and decomposes into nitrogen and sodium upon combustion thereof.

The high-pressure nitrogen generated from the gas-generating agent 39, is injected and charged into the collapsed spread bag 42. At this time, the spread bag 42, which is filled with the high-pressure nitrogen, instantaneously expands and unfolds.

When the inflator module 33 is operated so as to generate expansion gas in response to a control signal from the controller 20, the nitrogen, which is the expansion gas generated from the gas-generating agent 39 of the inflator module 33, must be injected into the inside of the spread bag 42 from the inside of the case 34. To this end, a portion of the case 34, at which the gas-generating agent 39 is positioned, is provided with an injection port 42, which communicates with the internal space in the spread bag 42.

In the embodiment of the present disclosure, the injection port 35 may include a plurality of injection ports, which are respectively provided at predetermined locations throughout the case 34. Each of the injection ports 35 may be coupled to a corresponding injection inlet 43 of the spread bag 42.

Consequently, when the igniting agent 38 of the inflator module 33 is ignited by the squib 37 and then the gas-generating agent 39 begins to be combusted by the igniting agent 38, the expansion gas (nitrogen), which is generated by the combustion of the gas-generating agent 39, is charged into the spread bag 42 through the plurality of injection ports 35, thereby causing the spread bag 42 to be instantaneously expanded.

Among the plurality of injection ports 35, the injection port 35 that is positioned at the center of the lower surface of the case 34 is maintained in the state of being connected to the spread bag 42 until the spread bag 42 is fully expanded and unfolded.

Meanwhile, at least some of the plurality of injection ports 35, for example, injection ports 35 positioned at the side surfaces of the case 34, are configured to be separated from the injection ports 43 of the spread bag 42 as the spread bag 42 is expanded while opening the cover 32*b* coupled to the lower end of the housing 31.

The reason why some of the injection ports 35 of the inflator module 33 are separated from the injection inlets 43 of the spread bag 42 is because the spread bag 42 is deformed in shape as the spread bag 42 is expanded.

Figure 4:
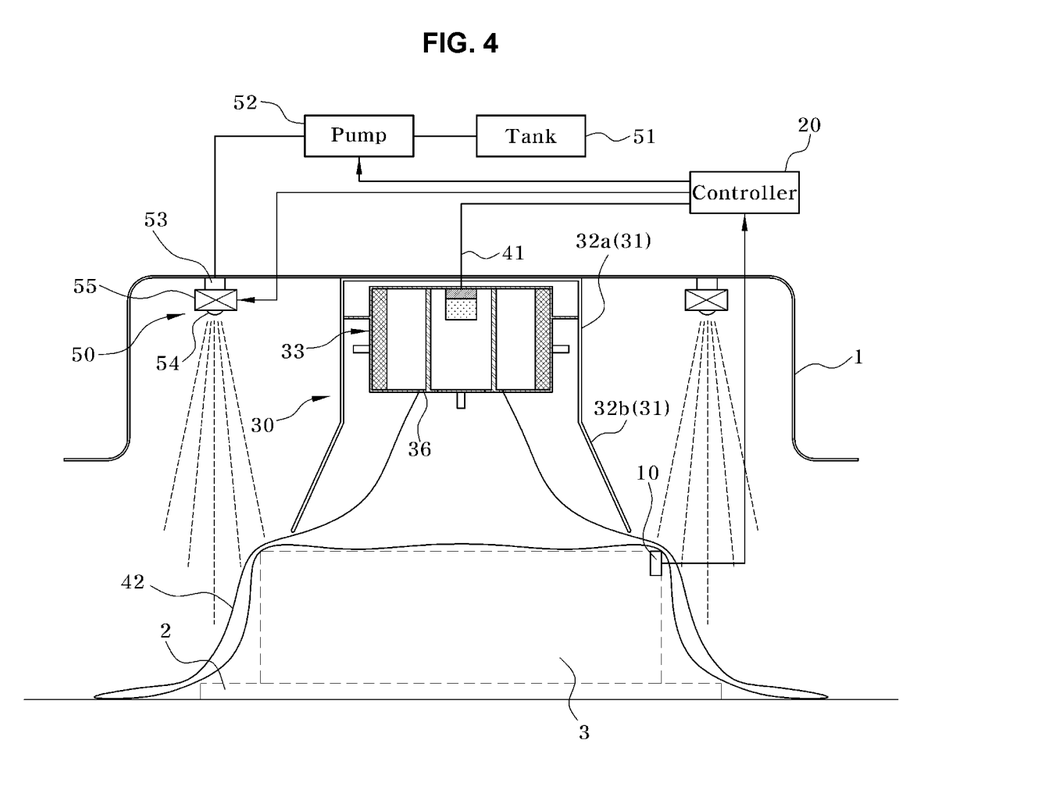
FIG. 4 is a view showing a spread bag according to the embodiment of the present disclosure, which is expanded so as to cover a battery pack positioned thereunder.

More specifically, FIG. 4 is a view showing the spread state of the spread bag 42 according to the embodiment of the present disclosure, in which the spread bag 42 is expanded so as to cover the battery pack 3 disposed thereunder.

As illustrated in FIG. 4, when the spread bag 42 is expanded through the lower open surface of the housing 31, the single or multiple injection ports 35 formed in the lower surface of the case 34 may be maintained in the state of being connected to the injection inlets 43 positioned at the upper portion of the spread bag 42 because the upper portion of the spread bag 42 is secured to the retainer 36 positioned at the lower surface of the case 34.

After the spread bag 42 is expanded somewhat, the single or multiple injection ports 35 positioned at the side surfaces of the case 34 are separated from the injection inlets 43 positioned at the other portions of the spread bag 42, and the injection inlets 43 in the spread bag 42 are thus opened.

Thereafter, the high-pressure nitrogen in the spread bag 42, which has been fully expanded, is discharged to the outside of the spread bag 42 through the opened injection inlets 43.

In the embodiment of the present disclosure, the spread bag 42 is unfolded so as to hermetically cover the battery pack 3 from above upon expansion, with the result that the periphery of the battery pack 3 is hermetically enclosed by the spread bag 42 so as to block the supply of oxygen to the battery pack 3, thereby suppressing fire.

In the embodiment of the present disclosure, the spread bag 42 may be made of a heat insulation material, or may be made of a material having flameproof and fireproof properties in addition to the heat insulation property.

For example, the spread bag 42 may be made of polyethylene (PE), phenol formaldehyde resin (PF), nylon, polyaramid, Kevlar, Nomex or the like.

The fire suppression apparatus according to the embodiment of the present disclosure may further include a cooling water supply 50, configured to sprinkle cooling water onto the spread bag 42, which has been unfolded so as to cover the battery pack 30.

The cooling water supply 50 may include a sprinkle pipe 53, which extends toward the upper portion of the battery pack 3 from the body panel 1, a nozzle 54, which is mounted on the sprinkle pipe 53 so as to be positioned over the battery pack 3 and which sprinkles the cooling water supplied through the sprinkle pipe 53, onto the battery pack 3 and the unfolded spread bag 42, which are disposed thereunder, and an electromagnetic valve 55, configured to open and close the cooling water channel in the sprinkle pipe 53 or the nozzle 54.

The cooling water supply 50 may further include a tank 51 for storing cooling water and a pump 52 for supplying the cooling water stored in the tank 51 to the sprinkle pipe 53. When the electromagnetic valve 55 is operated so as to be opened in the state in which the sprinkle pipe 53 is filled with the cooling water, which is supplied from the tank 51 by means of the pump 52 under pressure, the cooling water in the sprinkle pipe 53 may be discharged through the nozzle 54.

The pump 52 and the electromagnetic valve 55 are operated in response to a control signal output from the controller 20. Here, the controller 20 is configured to open the electromagnetic valve 55 so as to allow the cooling water to be discharged through the nozzle 54 from the sprinkle pipe 53 after a predetermined period of time has elapsed since initiation of expansion of the spread bag 42.

The electromagnetic valve 55 may be a solenoid valve.

As illustrated in FIG. 4, the sprinkle pipe 53, which is provided at the body panel 1, is disposed so as to uniformly sprinkle the cooling water onto the spread bag 42, which has been expanded so as to cover the battery pack 3. Here, a plurality of nozzles 54 and a plurality of electromagnetic valves 55 may be respectively provided at a plurality of sprinkle pipes 53.

Referring to FIG. 4, although it is noted that a total of two nozzles 54 are respectively disposed to the right and left of FIG. 4 and a total of two electromagnetic valves 55 are respectively disposed to the right and left of FIG. 4, this is only for illustrative purposes, and the present disclosure is not limited thereto. More nozzles 54 and more electromagnetic valves 55 may be appropriately dispersed and disposed at the body panel 1 so as to uniformly discharge the cooling water onto the entire area of the spread bag 42, which has been expanded to cover the battery pack 3.

When the cooling water is sprinkled onto the unfolded spread bag 42 after a predetermined period of time has elapsed since the initiation of the expansion of the spread bag 42, moisture is supplied to the spread bag 42, thereby bringing the spread bag 42 into closer contact with the battery pack 3.

Since the spread bag 42 is brought into closer contact with the battery pack 3 as mentioned above, it is possible to efficiently suppress a fire at the battery pack 3. In other words, since the spread bag 42 is brought into close contact with the battery pack 3 and the periphery of the battery pack 3 is hermetically sealed, thereby blocking the supply of oxygen to the battery pack, it is possible to reliably prevent spreading of fire.

Heretofore, the construction of the fire suppression apparatus according to the embodiment of the present disclosure has been described in detail. The operation of the fire suppression apparatus according to the embodiment of the present disclosure will now be described.

When the signal from the temperature sensor 10 mounted on the battery pack 3 is input to the controller 20, the controller 20 determines whether the criterion for determining outbreak of fire is satisfied, that is, whether the temperature of the battery pack 3 is greater than or equal to the reference temperature, based on the signal from the temperature sensor 10.

When the temperature of the battery pack 3 is greater than or equal to the reference temperature, the controller 20 determines that the criterion for determining outbreak of fire at the battery pack 3 is satisfied and outputs a control signal for expansion operation of the spread bag 42. In response to the control signal, a weak explosion occurs at the squib 37, thereby igniting the igniting agent 38.

When the igniting agent 38 is ignited, the gas-generating agent 39 begins to be combusted, and the gas-generating agent 39 is then combusted, thereby generating high-pressure expansion gas.

As a result, the high-pressure expansion gas is injected into the spread bag 42 through the injection port 35 in the case 34 and the injection inlet 43 in the spread bag 42, thereby expanding the spread bag 42. At this time, the spread bag 42, which is expanding, opens the cover 32b, and is unfolded so as to fully cover the battery pack 3.

At least some of the injection ports 35 provided at the case 34 are separated from the injection inlets 43 of the spread bag 42 while the spread bag 42 is expanded outwards from the housing 31 and is unfolded downwards. The expansion gas charged in the spread bag 42 is discharged through the injection inlets 43, which have been separated from the injection ports 35.

When some of the expansion gas in the spread bag 42 is discharged, the spread bag 42, which has been fully expanded, contracts and comes into closer contact with the battery pack 3. A predetermined period of time after the initiation of the expansion of the spread bag 42, the controller 20 controls the electromagnetic valve 55 to be operated so as to allow the cooling water in the sprinkle pipe 53 to be sprinkled onto the spread bag 42 through the nozzle 54.

When the cooling water is sprinkled onto the spread bag 42, which is covering the battery pack 3, so as to supply moisture to the spread bag 42, the spread bag 42 comes into closer contact with the battery pack 3 and the temperature of the battery pack 3 is lowered by means of the cooling water.

As is apparent from the above description, the fire suppression apparatus for a vehicle according to the present disclosure is designed to cover a target, at which a fire breaks out, with a heat insulation bag so as to block the supply of oxygen. Accordingly, it is possible to more quickly and efficiently suppress a fire occurring at an object mounted in a vehicle, which would otherwise be difficult to suppress through a conventional process of sprinkling a fire-extinguishing agent or water, and it is possible to more reliably prevent the spread of fire.

Furthermore, the fire suppression apparatus according to the present disclosure may be applied to suppression of fire at a vehicular battery, and may provide a superior performance of suppressing fire at a low cost.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A fire suppression apparatus for a vehicle, the fire suppression apparatus comprising:
   a sensor for detecting a condition of an object mounted in the vehicle;
   a controller configured to determine whether the condition of the object mounted in the vehicle, which is detected by the sensor, satisfies a predetermined criterion for determining outbreak of a fire at the object and to output a control signal for suppression of the fire when the condition of the object satisfies the predetermined criterion; and
   a spread bag apparatus, mounted in the vehicle, configured to unfold a collapsed spread bag toward the object in response to the control signal from the controller such that the unfolded spread bag hermetically covers the object, thereby suppressing the fire at the object,
   wherein the spread bag apparatus comprises:
      a housing mounted in the vehicle;
      an inflator module disposed in the housing so as to generate gas in response to the control signal from the controller; and
      a spread bag accommodated in the housing in a state of being collapsed, the spread bag being unfolded as the gas generated from the inflator module is injected thereinto,
   wherein the inflator module comprises a case disposed in the housing, the case accommodating therein a squib, an igniting agent and a gas-generating agent,
   wherein the case includes a plurality of injection ports through which the expansion gas generated from the gas-generating agent is injected into the spread bag, the plurality of injection ports being respectively coupled to injection inlets in the spread bag so as to allow the expansion gas to be injected into the spread bag, and
   wherein, when the spread bag is expanded and unfolded, some of the plurality of injection ports are separated from the injection inlets in the spread bag by shape deformation of the spread bag such that the gas charged in the spread bag is discharged to an outside of the spread bag through injection inlets from which the injection ports are separated.

2. The fire suppression apparatus of claim 1, wherein the object is a battery mounted in the vehicle.

3. The fire suppression apparatus of claim 1, wherein the sensor is a temperature sensor for detecting a temperature of the object, and
   wherein the controller compares the temperature of the object, which is detected by the temperature sensor, with a reference temperature, and determines that the criterion for determining outbreak of the fire at the object is satisfied when the temperature of the object is greater than or equal to the reference temperature.

4. The fire suppression apparatus of claim 1, wherein the spread bag apparatus is mounted in the vehicle so as to be positioned over the object and is configured to unfold the collapsed spread bag downwards toward the object.

5. The fire suppression apparatus of claim 1, wherein the housing comprises:
   a housing body having an internal space accommodating the inflator module and the spread bag; and
   a cover coupled to the housing body so as to support the spread bag accommodated in the housing body,
   wherein, when the spread bag is expanded, the spread bag separates the cover from the housing body to open the housing body and is unfolded outwards from the housing through the opened area in the housing body.

6. The fire suppression apparatus of claim 1, wherein the inflator module comprises:
   a squib configured to be operated in response to the control signal from the controller;
   an igniting agent configured to be ignited upon operation of the squib; and
   a gas-generating agent configured to be combusted by ignition of the igniting agent and to inject expansion gas, generated by the combustion, into the spread bag.

7. The fire suppression apparatus of claim 6, wherein the spread bag is disposed in a space between the case and the housing in a state of being secured at a portion thereof to an outer surface of the case via a retainer.

8. The fire suppression apparatus of claim 7, wherein the inflator module further comprises:
   a filter, which is disposed in the case so as to surround the gas-generating agent and removes foreign substances from the expansion gas generated from the gas-generating agent.

9. The fire suppression apparatus of claim 1, further comprising a cooling water supply mounted in the vehicle so as to sprinkle cooling water onto the spread bag, which has been unfolded so as to cover a battery pack.

10. The fire suppression apparatus of claim 9, wherein the cooling water supply comprises:
    a sprinkle pipe mounted in the vehicle so as to extend toward an upper portion of the battery pack, the cooling water being supplied to the sprinkle pipe;
    a nozzle coupled to the sprinkle pipe so as to sprinkle the cooling water in the sprinkle pipe onto the spread bag, which has been unfolded so as to cover the battery pack; and
    an electromagnetic valve configured to open and close a cooling channel in the nozzle or the sprinkle pipe in response to a control signal for sprinkling of the cooling water, which is output from the controller.

11. The fire suppression apparatus of claim 10, wherein the controller outputs the control signal to sprinkle the cooling water after a predetermined period of time has elapsed since the spread bag apparatus is activated so as to unfold the spread bag.

* * * * *